(12) United States Patent
Baur et al.

(10) Patent No.: US 11,352,971 B2
(45) Date of Patent: Jun. 7, 2022

(54) METHOD OF CONTROLLING A FUEL INJECTOR

(71) Applicant: DELPHI AUTOMOTIVE SYSTEMS LUXEMBOURG SA, Bascharage (LU)

(72) Inventors: Peter Baur, Trier (DE); Volker Heise, Trier (DE)

(73) Assignee: DELPHI AUTOMOTIVE SYSTEMS LUXEMBOURG S.A., Bascharage (LU)

( * ) Notice: Subject to any disclaimer, the term of this patent is extended or adjusted under 35 U.S.C. 154(b) by 0 days.

(21) Appl. No.: 17/047,440

(22) PCT Filed: Apr. 12, 2019

(86) PCT No.: PCT/EP2019/059483
§ 371 (c)(1),
(2) Date: Oct. 14, 2020

(87) PCT Pub. No.: WO2019/201789
PCT Pub. Date: Oct. 24, 2019

(65) Prior Publication Data
US 2021/0148297 A1 May 20, 2021

(30) Foreign Application Priority Data

Apr. 15, 2018 (GB) ..................... 1806143

(51) Int. Cl.
*F02D 41/20* (2006.01)
*F02D 41/24* (2006.01)
*F02M 51/06* (2006.01)

(52) U.S. Cl.
CPC ......... *F02D 41/20* (2013.01); *F02D 41/2467* (2013.01); *F02D 2041/2037* (2013.01);
(Continued)

(58) Field of Classification Search
CPC ..... F02D 2041/2024; F02D 2041/2027; F02D 2041/2037; F02D 2041/2041;
(Continued)

(56) References Cited

U.S. PATENT DOCUMENTS

| 6,102,008 A | 8/2000 | Maeda et al. |
| 2010/0224809 A1* | 9/2010 | Koch .................. G05B 13/021 251/129.15 |

(Continued)

FOREIGN PATENT DOCUMENTS

GB 2552516 A 1/2018

*Primary Examiner* — Robert A Werner
(74) *Attorney, Agent, or Firm* — Warner Norcross + Judd LLP

(57) ABSTRACT

A method is provided for controlling a solenoid actuated fuel injector having a solenoid actuator which moves a pintle and needle arrangement such that the needle moves away from a valve seat to an open position and also includes circuitry which applies chopped hysteresis control subsequent to an energisation phase. The method includes a) obtaining a signal of the current or voltage across the solenoid; b) analyzing the voltage or current to detect a chopped hysteresis pulse; c) determining the time point of the end of said chopped hysteresis pulse; and d) applying a braking pulse to the solenoid, the timing of which is dependent on the results of step c).

2 Claims, 5 Drawing Sheets

(52) U.S. Cl.
CPC ............... *F02D 2041/2051* (2013.01); *F02D 2041/2055* (2013.01); *F02M 51/061* (2013.01)

(58) Field of Classification Search
CPC ..... F02D 2041/2051; F02D 2041/2055; F02D 41/20; F02D 41/2467
USPC ........................................................ 123/490
See application file for complete search history.

(56) References Cited

U.S. PATENT DOCUMENTS

2013/0186969 A1    7/2013   Vandewalle
2015/0040871 A1*  2/2015   Ravenda ................ F02D 41/20
                                                             123/490

* cited by examiner braking and detection pulse 2A

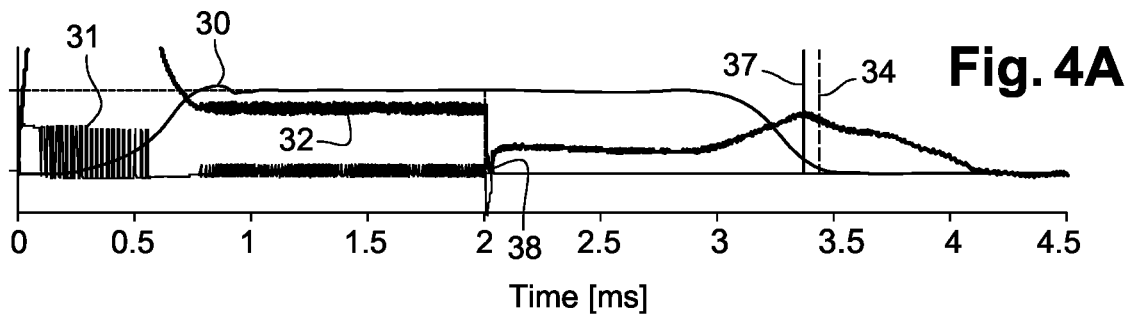
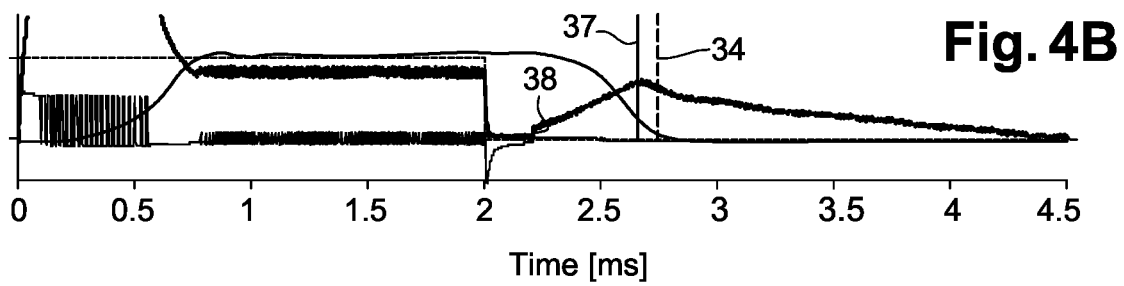
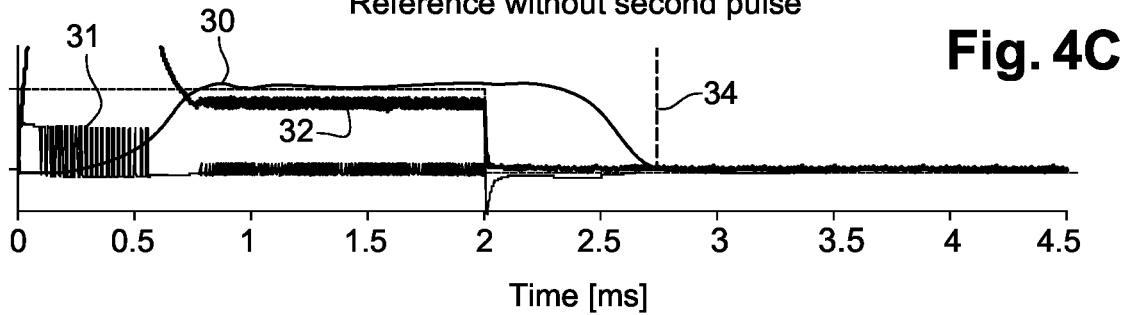

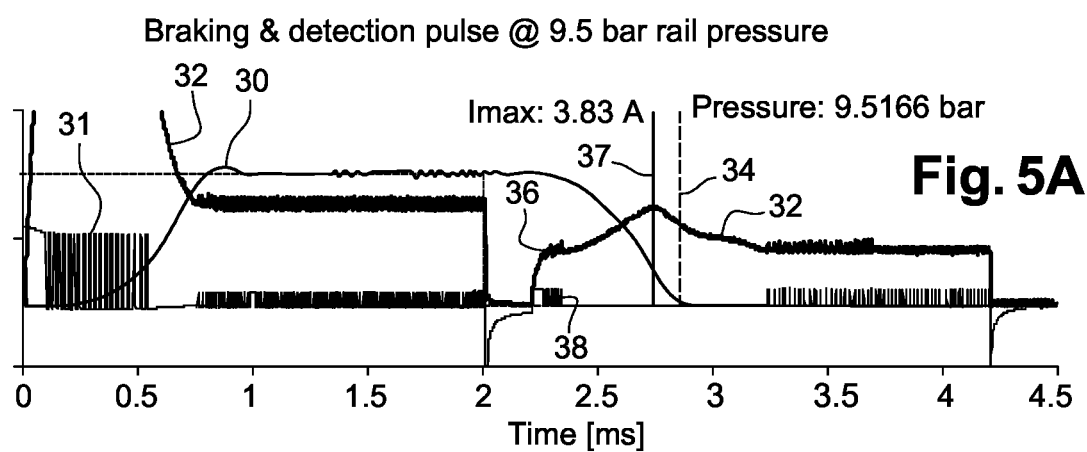
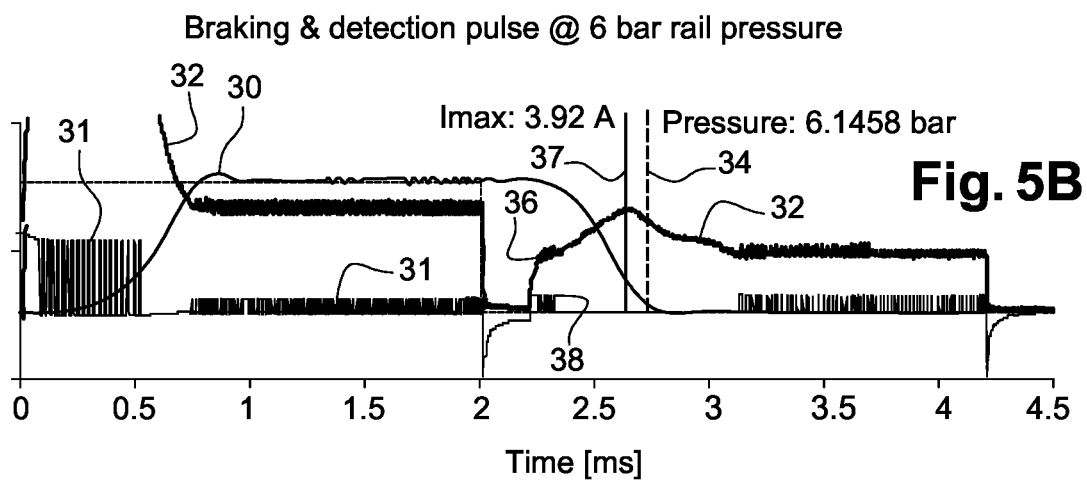

METHOD OF CONTROLLING A FUEL INJECTOR

CROSS REFERENCE TO RELATED APPLICATIONS

This application is a national stage application under 35 USC 371 of PCT Application No. PCT/EP2019/059483 having an international filing date of Apr. 12, 2019, which is designated in the United States and which claimed the benefit of GB Patent Application No. 1806143.2 filed on Apr. 15, 2018, the entire disclosures of each are hereby incorporated by reference in their entirety.

TECHNICAL FIELD

This invention relates to solenoid actuated fuel injectors and has particular but not exclusive application to directly operated injectors for gaseous fuel. It has particular application in determining the time when a valve of such injectors starts to close, and further to time a braking pulse dependent thereon.

BACKGROUND OF THE INVENTION

Fuel injectors for liquid and especially for gaseous fuels wear out over time when the moving parts hit the end stop at high speed. An injector is typically opened by activation of a solenoid actuator which moves a pintle/needle arrangement away from a valve seat against the action of a core spring; closing is typically driven by the core spring that accelerates a pintle back to closed position after a solenoid controlled actuator is turned off. Maximum speed is reached just before the impact at the end position. The high impact speed of the moving mass results in deformation/wear of the contact surfaces and high noise emissions. One means to reduce this effect is to implement a kind of mechanical/hydraulic/pneumatic damping. Other solutions place a braking pulse after the end of fueling command. The start of this braking pulse is implemented either after a fixed time delay or an adapted time delay based on the closing behavior of the previous fueling pulse.

Many injector applications need to determine the point of time where the injector closes in order to correct the pulse width to compensate for tolerances. This closing detection is often realized by searching the inflection in the injector low side voltage after the end of fueling.

The implementation of mechanical/hydraulic/pneumatic damping at the injector closing as a means of reducing the impact speed results in increased manufacturing effort and higher cost and might on the other hand have a negative impact on the opening delay. The method of placing a braking pulse with a fixed or iteratively adapted intensity, shape and/or time delay risks causing a reopening event in transient conditions or changing sticking conditions. Especially during engine warm up after a cold crank, the influencing factors for the injector closing response/timing change rapidly; this makes it difficult to adapt the braking pulse parameters from shot to shot.

Some methods use look up tables and iterative adaptation to determine braking pulse parameters (time delay, duration, intensity) but input parameters for these techniques may not be available fast enough or precise enough. Other prior art inventions have difficulties to detect the closing event (closing response) at low pulse width due to fading out inflection in the injector voltage decay after closing.

It is an object of the invention to overcome the aforementioned problems.

SUMMARY OF THE INVENTION

In one aspect is provided a method of controlling a solenoid actuated fuel injector, said injector including a solenoid actuator adapted to be energized so as to move a pintle and needle arrangement, such that the needle moves away from a connected thereto, away from a valve seat to an open position, and including circuitry adapted to apply chopped hysteresis control subsequent to an energisation phase, comprising:
a) obtaining a signal of the current or voltage across the solenoid;
b) analyzing the voltage or current to detect a chopped hysteresis pulse
c) determining the time point of the end of said chopped hysteresis pulse;
d) applying a braking pulse to the solenoid, the timing of which is dependent on the results of step c).

Step c) may comprises identifying chopped hysteresis pulse; and determining when the voltage thereafter is at zero level for more than a predetermined time.

BRIEF DESCRIPTION OF THE DRAWINGS

The present invention is now described by way of example with reference to the accompanying drawings in which:

FIG. 4a,b show injection events with different closing response to prove that the peak current of the detection pulse occurs at the injector closing event and FIG. 4c shows a standard fueling pulse without detection pulse as a reference;

FIGS. 5a and 5b again show similar plots to those above and shows and compares closing peak current level and position for 9.5 bar and 6 bar rail pressure respectively;

DESCRIPTION OF THE PREFERRED EMBODIMENTS

Background

Figure 1:
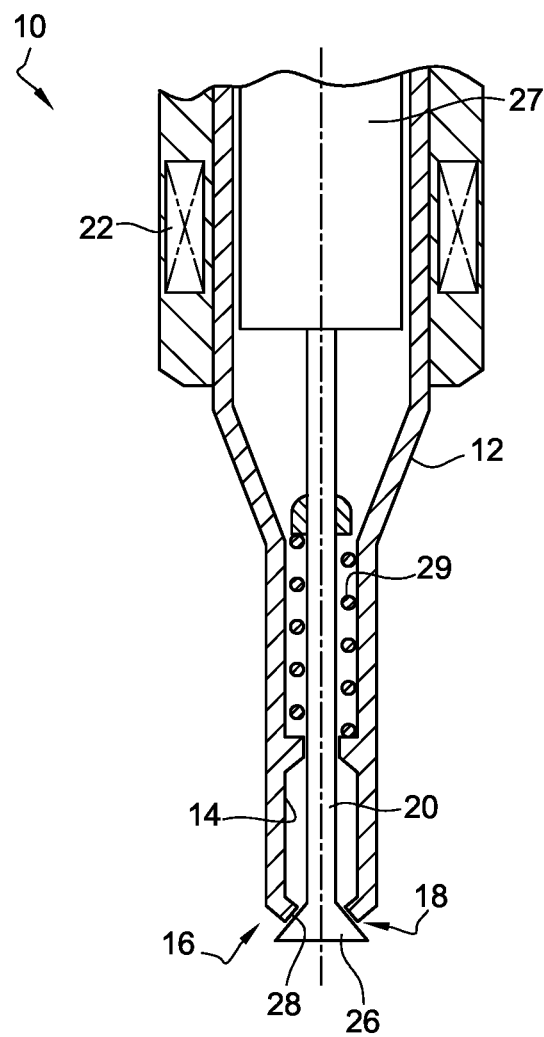
FIG. 1 shows a conventional solenoid actuated fuel injector for which embodiments of the invention may be used.

FIG. 1 generally illustrates a conventional solenoid actuated fuel injector 10 comprising a cylindrical tubular body 12 having a central feed channel 14, which performs the function of a fuel duct and ends with an injector tip 16 having an outlet orifice 18 controlled by a pintle assembly 20 (also simply referred to as needle or pintle) operated by an electromagnetic, solenoid actuator 22. The pintle 20 has a rod-shaped body axially guided in the injector body 12 and acts as plunger. The pintle 20 has a sealing head 26 adapted to cooperate with a sealing seat 28 surrounding the orifice 18 in the injector tip 16. At its other end, the pintle 20 cooperates with an armature 27 of the solenoid actuator that causes displacement of the pintle 24 by the action of the solenoid 22 between a closed position and an open position off the sealing seat 28 at the injector tip 16. As it is well known, the armature 27 is set in motion by the electromagnetic field generated by the solenoid coil 22, when energized. For this purpose, the armature 27 pushes onto the pintle 20. No rigid connection is required between the armature and pintle, although such connection may exist.

As it will appear from FIG. 1, the present injector 10 is of the out-ward opening type. Selective energizing of the solenoid coil 22 thus pushes the pintle in opening direction (downward with respect to FIG. 1) and hence allows lifting the pintle off its seat 28 to perform fuel injection. Reference sign 29 indicates a return spring that tends to hold the pintle 20 in the closed position and forces the pintle 20 towards the sealing seat 28 when open.

Methodology According to Aspects of the Invention

According to one aspect, the methodology detects the start of the closing movement of the injector pintle and uses this as a trigger to start the boost braking pulse. This ensures that the braking pulse is not started too early and avoids the risk of reopening. The application of a (boost) braking pulse after the fueling pulse can be used especially for DI-CNG injectors with higher stroke but might be applied as well to gasoline injectors.

The core of the invention is to identify when the valve starts to close i.e. when the pintle starts to move from the open position. In aspect of the invention, this is done by looking at the chopped (hysteresis pulse) that arises from recirculation control at the end of a deactivation phase.

Background to Re-Circulation Phase

Figure 2A:
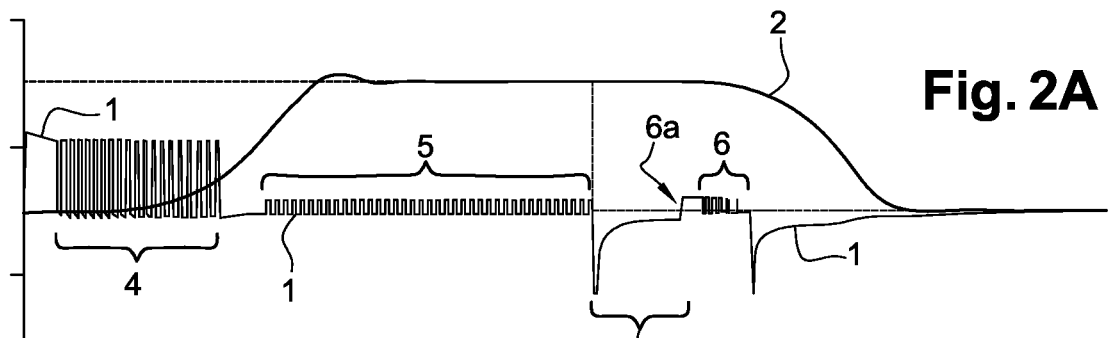
FIGS. 2a and b shows plots of voltage across the solenoid actuator against time during an injection cycle (i.e. consequent to a corresponding pulse profile), as well as plots of pintle/needle displacement for different control/actuation schemes.

FIG. 2a shows a plot of the characteristics of the voltage 1 across the solenoid actuator against time during an injection cycle (i.e. consequent to a corresponding pulse profile), versus the pintle/needle displacement 2. Plot 1 shows the actual voltage across the actuator e.g. solenoid of the fuel injector as a result of a command pulse sent to the fuel injector by the ECU. The applied voltage across the injector is based on the command pulse, and may comprise a series of phases which will be described hereinafter. It is to be noted that for a particular command pulse different voltage profiles may be applied to the actuator (e.g. solenoid, according to design strategy). It is to be noted that the voltage trace measured across a solenoid actuator will be somewhat influenced by the movement of the valve/solenoid actuator by virtue of induced current/voltage which will have an influence on the voltage. As can be seen on FIG. 2a, once injector command is received, in a first phase 4, a relatively high initial activation/boost pulse voltage 4 is applied to the actuator in order to actuate it, which causes the pintle/needle to start moving and the needle to move away from the valve seat. The pintle starts to move rapidly. After a short while as the pintle starts to move, the drive pulse (voltage) is reduced and a short time after this when the pintle reaches maximum displacement, the drive pulse decreased to a relatively low level called the "hold" phase 5. This is maintained for a set time and then the pulse is reduced to zero once the fueling command is inactive, and the voltage turns negative before creeping back to zero. A short time thereafter the armature/pintle is forced to move back in the opposite direction to close the valve by spring means.

Figure 6:
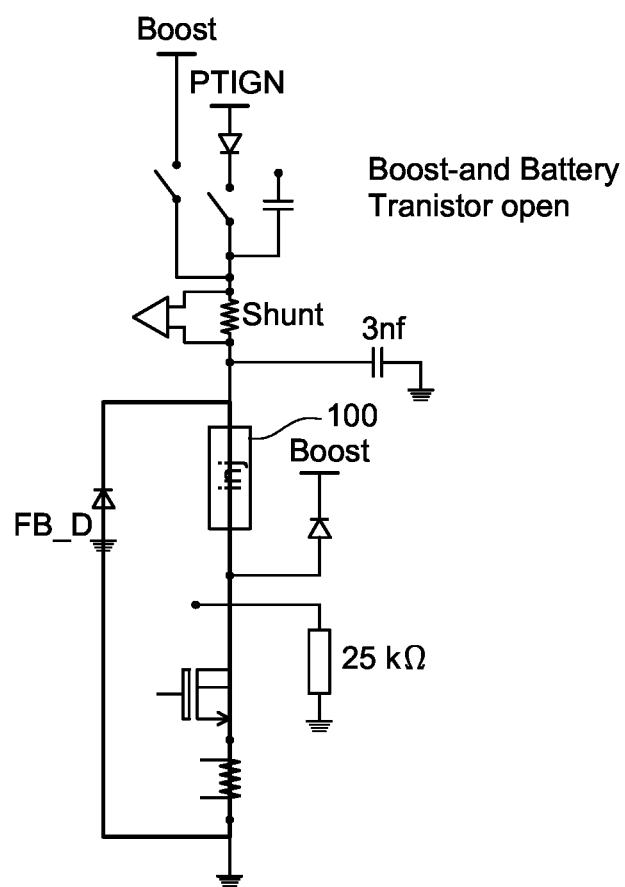
FIG. 6 shows a injector driver circuit and the injector coil.

Typically after the end of the hold phase in order to de-energise the coil there is a de-energisation phase, shown with reference numeral 100. This is sometimes referred to as a fast transition phase where the voltage is reduced to zero or even a negative level and is applied is required to remove the magnetic force. After the fast transition phase, a low-hysteresis-controlled coil current is applied to the injector coil which is chopped in nature. This provides recirculation. Without this, the injector would not close for long time. FIG. 6 shows a circuit which can be used to apply the chopping (i.e. hysteresis).

Figure 2B:
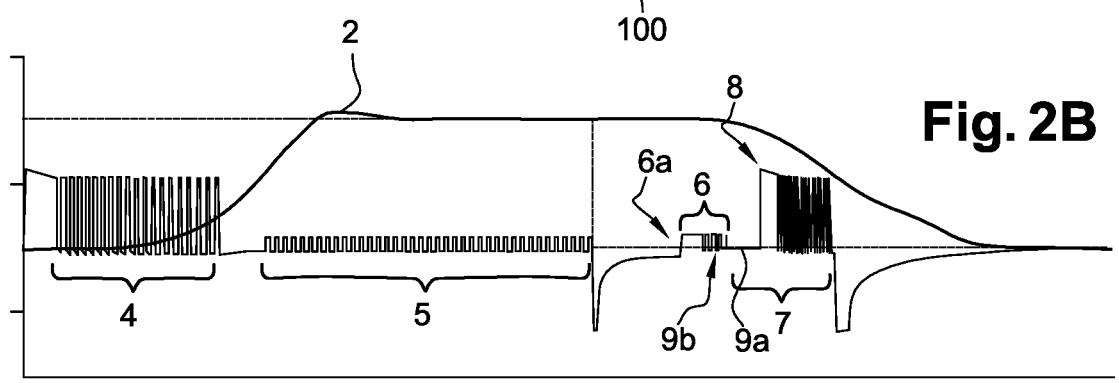

The chopped hysteresis or recirculation pulse 6 starts in FIG. 2 at point 6a and is started by the ECU when it closes the low side transistor and sets a desired current to the hysteresis controller. If the current in the circuit is above the upper current set-point threshold, it is automatically in recirculation mode, if it is below the lower threshold, the upper transistor would turn on and the battery voltage would drive the current though the coil. In FIG. 2b the end of this pulse has reference numeral 9b. It is to be noted this is the end of supply of electric energy out of the battery because of the armature movement the coil turns from consumer to generator and drives the current without external supply. But the current still recirculates. Hereinafter this pulse which is to be detected will be referred to generally as a chopped hysteresis pulse and may comprise one or more chopped pulses.

So to recap, the recirculation phase is when the magnetic energy stored in the coil drives the current therein and not the battery or boost voltage. This happens if the low side transistor is closed (conductive) and there is magnetic energy in the coil. Then the lower coil side is connected to GND and the upper side of the coil is connected to ground via a fly-back diode.

It is important to note that the start of the pintle closing in the chopped hysteresis pulse 6 (after the fast transition phase) is detectable in the voltage or current. Thus by observing and analyzing plots of voltage or current, the pintle closing can be detected. This chopped hysteresis pulse is referenced by reference numeral 6 in FIGS. 2a and 2b. The chopped hysteresis pulse results in initiation by the ECU when it closes the low side transistor and sets a desired current to the hysteresis controller. If the current in the circuit is above the upper current set-point threshold it is automatically in recirculation mode, if it is below the lower threshold, the upper transistor would turn on and the battery voltage would drive the current though the coil.

Application of the Invention

In aspects of the invention the re-circulation pulse is used to determine when the pintle starts to return to the closed position. This time can then be used, e.g. to optimally time a braking pulse applied to the solenoid coil to slow the movement of the armature/pintle arrangement on closing thus reducing wear.

So as mentioned above and returning to FIG. 2, before the armature and pintle starts to move back at time point 9b there is a small chopped hysteresis pulse in the voltage plot where there is a small positive voltage and where the hysteresis controller is set to control a low current (e.g. 1 A to 1.5 A). This low current chopped hysteresis pulse causes a slight reduction of the closing velocity. It acts to counteract against the spring force after the fueling pulse thus even when it occurs before the actual movement it reduces the effective force balance (spring force magnetic actuator force) and since there is a slight delay between current in the coil and magnetic force it applies a slight braking.

When the armature movement starts to induce voltage and current in the coil during the low current chopped hysteresis pulse, the hysteresis controller will stop chopping because the current rises.

So in aspects of the invention the end of the chopped hysteresis phase is identified i.e. detected (either in the voltage or the current plot) and this is used to determine the time the pintle starts to close. This in turn can be used to initiate the braking pulse and its timing as will be explained hereinafter.

Braking Pulse Application

FIG. 2b shows a similar plot to FIG. 2a where there is strong braking pulse is applied after the chopped hysteresis pulse. As mentioned when the armature movement starts to induce voltage and current in the coil during the chopped hysteresis pulse, the hysteresis controller will stop chopping because the current rises. The chopping pulse will then end. The detection of the end of the chopping pulse (either by monitoring the current or the chopping voltage) is used to detect the start of the pintle moving and can be used to the trigger (and time) a boost braking pulse 7 with a relatively high voltage (boost voltage). This boost braking pulse will then be applied for a fixed time period and thereafter the coil will be de-energized. The chopped hysteresis pulse is thus a kind of detection pulse used in subsequent control. It should be noted that the end of the chopped hysteresis pulse can be detected by looking at either the current or voltage plot of the solenoid though it is more practicable and preferable to look at the voltage.

The boost voltage of the braking pulse may be applied a set time 8 after the end of the chopped hysteresis pulse.

The boost braking pulse may be triggered if an extended zero voltage phase is detected. An extended zero voltage phase may be considered when the transistor off time of the chopping is longer than a calibratable time e.g. twice the off time of the last 3 switching events.

FIG. 6 shows a injector driver circuit and the injector coil (which is also suitable as brake pulse/recirculation circuit suitable to implement the invention. When $I_{coil} > I_{coil-set}$, during braking the upper transistors are open and the coil 100 is in short circuit and I is only attenuated by the resistance of the voltage drop of diode and transistor. However induce voltage from eddy currents continue to drive current in the coil.

Correct Identification of the End of the Chopped Recirculation Phase

If looking at the chopped voltage of the chopped hysteresis pulse, it is important that the end of chopping is correctly identified. As can be seen this identifies the valve starting to close may comprise a main pulse with some small pulses of very narrow width. After this the voltage of the chopped pulse drops to zero and there is an extended zero voltage period 9a which start at time-point 9b. The start of the extended zero voltage period 9b may be used to trigger the timing of braking pulse.

However since the hysteresis control will periodically switch on and off, the braking pulse cannot be triggered right at the point 9b because at this point it is not yet known if it is an extended zero voltage phase or a normal zero voltage phase of the duty cycle of the recirculation. The end of the recirculation/chopped hysteresis phase can only be confirmed (identified) (and thus braking pulse can only be triggered) when the voltage is at zero for a relatively longer time i.e. if the usual zero voltage phase time in the recirculation mode is exceeded—or in other words when a predetermined time is exceeded.

The pintle will be partially closed already by the time the magnetic force in the coil is fully developed. It is advantageous to apply the braking force only towards the end of the closing phase in order to realize a soft landing of the pintle without risk of reopening. The max. and min. current thresholds of the hysteresis/chopped control are preferably selected low enough in order to have no significant impact on the start of the closing.

So after the end of the injector fueling pulse, a fast transition phase de-energizes the coil in order to take out the magnetic energy, thereafter a chopped hysteresis recirculation phase occurs and which finishes when the pintle/armature starts to close. The chopped hysteresis recirculation phase is provided by closing the low side transistor in the injector driver and requesting a low hysteresis-controlled coil current after the fast transition phase.

So in summary the start of the pintle/armature movement can be detected by determining the end of the recirculation phase.

Preferably the braking pulse is constant with a low current level that generates an actuator force level which remains below the reopening force but can reduce the closing velocity. This implementation does not require necessarily a control of the braking pulse parameters due to the low force level and is still more robust while it might not reach full deceleration capability.

FIGS. 3, 4 and 5 show only the application of a detection pulse without a boost braking pulse.

Figure 3A:
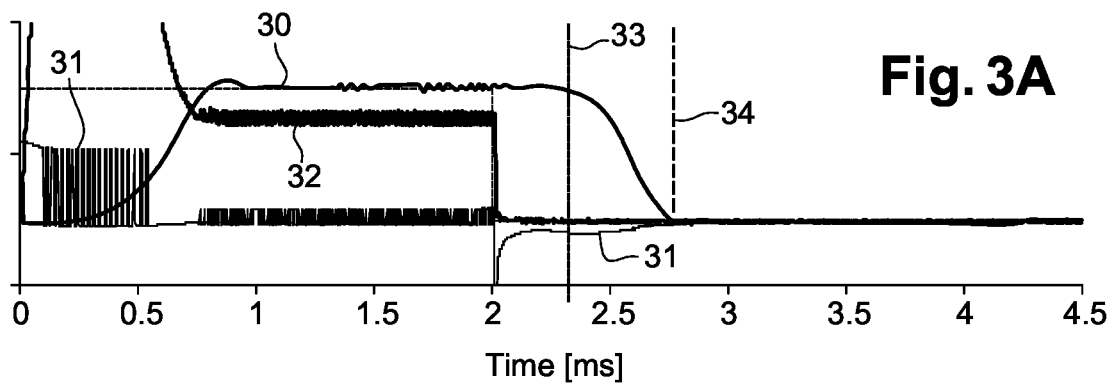
FIGS. 3a and 3b shows parameters of pintle displacement, current through the solenoid and voltage across the solenoid during an activation cycle of the solenoid actuated fuel injector according to examples for a standard fueling pulse without chopped hysteresis pulse, and a fueling pulse followed by a chopped hysteresis pulse where the peak of the current indicates the closing event respectively.
Figure 3B:
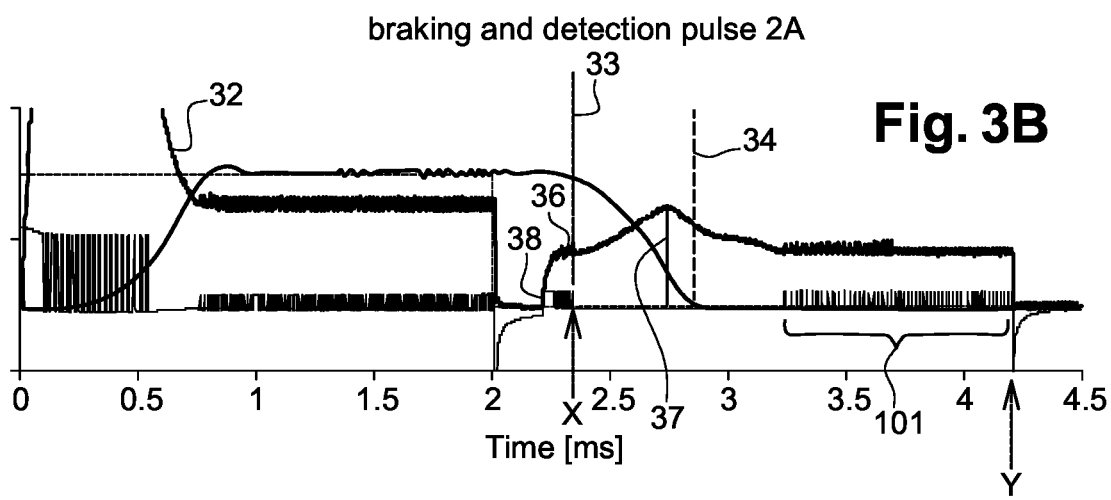

FIGS. 3a and 3b shows various parameters of: pintle displacement 30, current 31 through the solenoid and voltage 32 across the solenoid during an activation cycle of the solenoid actuated fuel injector according to examples, and the time of start of closing 33 and finishing closing 34.

FIG. 3a shows a 2 ms fueling pulse followed by a recirculation without braking pulse and FIG. 3b shows a fueling pulse followed by a short recirculation without braking pulse. A chopped hysteresis pulse 38 (which is used for detection purposes if a braking pulse is to be applied) in the voltage plot 32 is shown; 36 is the chopped hysteresis pulse in the current plot. The end of this chopped hysteresis pulse, which is used for detection is marked at time X. It is to be noted that chopped hysteresis control (with different current set points said phase that is shown in FIG. 3b) starts at point 38 and ends at the time of 4.25 ms at time Y. In the complete duration from time 2.25 to 4.25 ms, there is no change of settings; it is set to hysteresis control with a current set point of 2 A. However the term "chopped hysteresis pulse" for the purposes of the performing the invention is defined as the first identifiable pulse after the hold phase or any fast de-energisation phase. As mentioned this pulse may comprises a series of (chopped pulse), the end of which is identified by an extended zero period. This pulse 38 ends at time point X. Strictly speaking there may be another much later chopped hysteresis pulse 101.

Reference numeral 37 is the time of maximum current after closing.

FIG. 4a, b show injection events with different closing response to prove that the peak current of the detection pulse occurs at the injector closing event. FIG. 4c shows a standard fueling pulse without detection pulse as a reference. FIGS. 5a and 5b again show similar plots to those above and shows and compares closing peak current level and position for 9.5 bar and 6 bar rail pressure respectively. Reference numerals in FIGS. 4 and 5 are the same as in FIG. 3.

Prior art methods do not trigger the braking pulse based on the measured start of the closing at the current pulse and with that represent not a real closed loop control. Using learned correction tables of previous pulses does not guarantee to place the braking pulse always at the right time with the right intensity, especially in transient phases. Other solutions measure the pintle closing event out of an inflection of the low side voltage during recirculation phase (both, upper and lower transistor of the injector driver remain, open), what is difficult at low pulse widths and requires more processing resources.

This invention ensures to place the boost braking pulse always at the right time in closed loop control. The application of a low current braking pulse with battery voltage allows a slight reduction of the closing velocity for less acoustic noise and better life time expectation. The invention allows as well combining braking pulse and closing detection for each fueling pulse. The application of a 0 A detection pulse allows the detection of the closing time with higher robustness over a wider pulse width range compared to the prior art detection via the low-side voltage interpretation.

The invention claimed is:

1. A method of controlling a solenoid actuated fuel injector, said solenoid actuated fuel injector including a solenoid actuator configured to be energized in an energization phase so as to move a pintle and needle arrangement such that the pintle and needle arrangement moves away from a valve seat to an open position and also including circuitry that provides recirculation control subsequent to the energization phase and prior to application of a braking pulse, the circuitry being configured to apply a chopped hysteresis pulse during recirculation control, said method comprising:
   a) obtaining a signal of current or voltage across the solenoid actuator;
   b) analyzing the signal of current or voltage to detect the chopped hysteresis pulse that is subsequent to the energization phase;
   c) determining a time point of an end of said chopped hysteresis pulse; and
   d) applying the braking pulse to the solenoid actuator, a timing of which is dependent on the results of step c).

2. A method as claimed in claim 1, wherein step c) comprises identifying the chopped hysteresis pulse; and determining when voltage thereafter is at zero level for more than a predetermined time.

* * * * *